M. CLARK.
VEHICLE WHEEL TIRE.
APPLICATION FILED MAR. 18, 1912. RENEWED NOV. 21, 1913.
1,108,703.  Patented Aug. 25, 1914.
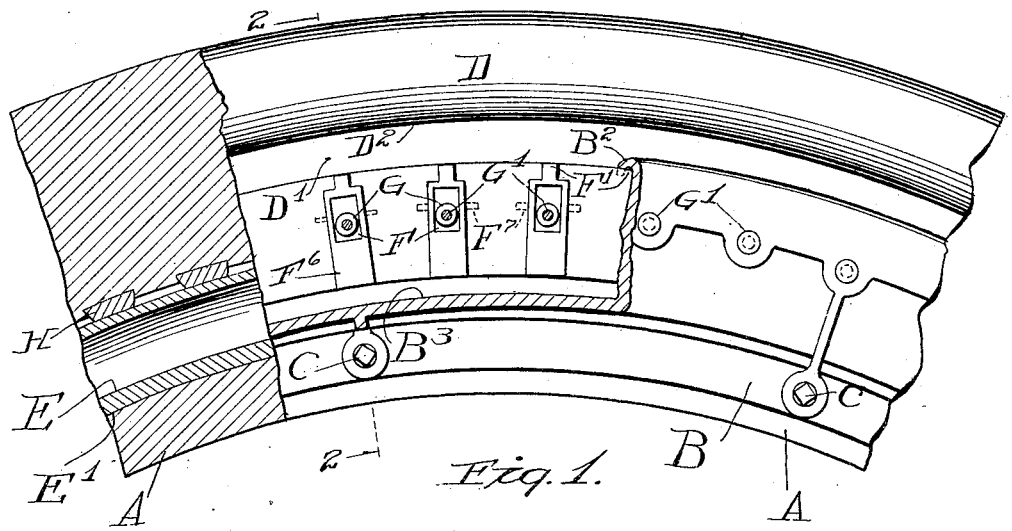
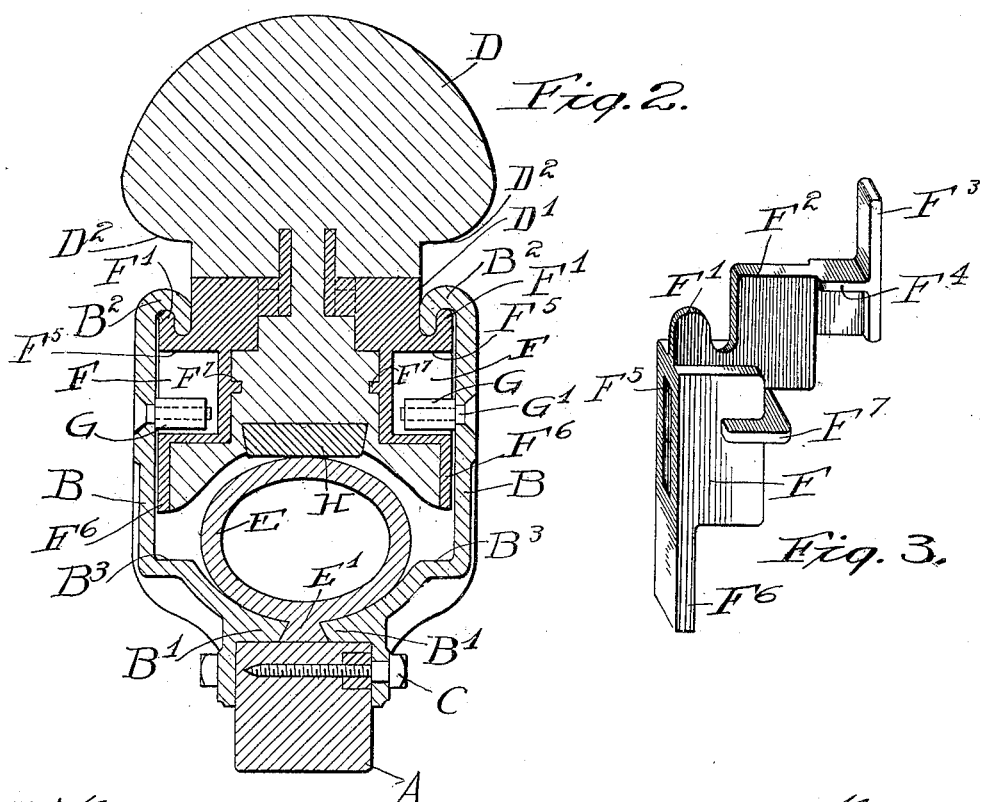
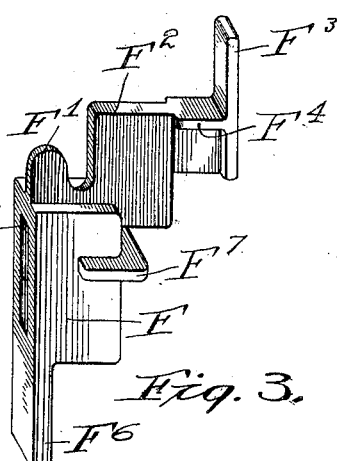

UNITED STATES PATENT OFFICE.

MELVILLE CLARK, OF CHICAGO, ILLINOIS.

VEHICLE WHEEL-TIRE.

1,108,703.  Specification of Letters Patent.  Patented Aug. 25, 1914.

Application filed March 18, 1912, Serial No. 684,513. Renewed November 21, 1913. Serial No. 802,329.

*To all whom it may concern:*

Be it known that I, MELVILLE CLARK, a citizen of the United States, residing at Chicago, in the county of Cook and State of Illinois, have invented new and useful Improvements in Vehicle Wheel-Tires, of which the following is a specification, reference being had to the accompanying drawings, forming a part thereof.

The purpose of this invention is to provide an improved construction of pneumatic and cushioned tires for vehicle wheels, especially adapted for automobile wheels and the like.

It consists in the elements and features of construction shown and described in the drawings as indicated in the claims.

In the drawings: Figure 1 is a partly sectional side elevation of a segment of a wheel rim and tire thereon embodying this invention. Fig. 2 is a section at the line 2—2 on Fig. 1. Fig. 3 is a perspective view of one of the metal housings which are embedded in the tread member.

In general features the construction shown in this application is similar to that illustrated in my Patent No. 1,006,465, dated October 24, 1911.

The drawings show the customary wood felly, A, of the wheel provided with lateral metal guards, B, B, closely fitted to the felly, A, and secured thereto by means of special screws, C. Between the lateral guards, B, B, is positioned the tread member, D, of the tire, and within the annular housing thus formed of the felly, A, guards, B, B, and tread, D, there is positioned the pneumatic tube, E, whose dovetailed rib, $E^1$, is securely engaged between the inwardly projecting flanges, $B^1$, $B^1$, of the guards, B, B, by which engagement the tube, E, is effectively prevented from creeping circumferentially along the felly, A.

The tread member, D, being constructed of soft rubber is flexible and elastic to a certain extent, but in order to bring into service the resiliency of the pneumatic member, E, the tread member, D, must be supported upon it with a capacity for movement radially with respect to the wheel. For this purpose the tread, D, has embedded in it at each side a series of metal pockets, F, into which there extend guide rollers, G, whose bearing studs, $G^1$, are fixedly carried by the lateral guards, B, B. The interior dimension of each pocket, F, measured in the direction of the circumference of the wheel is practically equal to the diameter of the guide roller, G, within it, thus permitting no material movement of the tread, D, in circumferential direction and thus preventing it from creeping along and upon the tube, E. The radial dimension of the pocket is made sufficient to permit the proper amount of radial play of the tread member, which depends upon the safe limit of compression of the pneumatic tube, E.

As shown in the drawing, the outer edge of each guard, B, is inturned at $B^2$, forming a hook-shaped rim which has a groove opening toward the wheel axis. Each of the metal pockets, F, is extended into a fitting formed with a rounded lug, $F^1$, positioned to be engaged by the hooked rim, $B^2$, of the guard. Between successive fittings, the rubber tread itself is formed at each side with a rib of cross-section similar to that of the lug, $F^1$, and similarly adapted to fit into the groove of the hooked rim, $B^2$. In addition to the lug, $F^1$, the upper end of the fitting, F, comprises a web portion, $F^2$, extending inwardly of the tread, D, and terminating in flanges, $F^3$ and $F^4$, the former of which extends in a plane transverse to the wheel axis and in the direction of rotation of the wheel, and thus anchors a fitting in the tread against lateral stresses. By virtue of the hold thus obtained in the rubber of the tread, D, the fitting, F, becomes practically an integral part of the tread, and the hooked engagement of the lugs, $F^1$, is found to be the only necessary tie across the outer or circumferentially extending portions of the guards, B, B.

In order to prevent the entrance of mud or grit between the guard, B, and the tread, D, during the radial sliding of the latter within the former, the hooked rim, $B^2$, is formed to fit closely against the flat portion, $D^1$, of the tread so that its tendency will be to wipe this part of the tread clean as the tread slides past it. It will be understood that since the fittings, F, are so set in the tread as to come flush at the surface, $D^1$, the wear of the rubber due to the sliding motion will be but slight on account of the comparative stubbornness of the metal fitting, F, and the slow wearing away thereof. It is calculated that in ordinary use with the pneumatic tube, E, properly inflated the range of movement of the tread member, D, within the guards, B, B, will not be sufficient to disengage the hooks, B², from the lugs, F¹, but even in the event of such disengagement it would occur only at one or two fittings at one time and there would be no tendency of the tread to come loose from the guards.

If for any reason the pneumatic tube, E, should ever become deflated, it is desirable that the tire be not put out of commission for this reason but that it may still be safely run, though suffering perhaps some loss of resiliency. For this purpose the portion of the tread, D, outside of the guards, B, B, is made to overhang the said guards at D², D², so that upon deflation of the tube, E, the guards, B, B, will rest upon these overhanging portions of the tread. In addition to these points of support, it is designed that the guide rollers, G, shall just reach the limit of outward travel in their pockets, F, at the time when the guards, B, B, come in contact with the tread at D², so that a part of the load will be transmitted through the rollers, G, to the pockets or housings, F, at F⁵, and thence into the body of the tread member, D. And in addition to this, a third point of support is provided at the right-angled shoulder, B³, which is positioned to receive the inwardly-extending feet, F⁶, of the fittings, F. Of the three points of support just described, it will be seen that two consist in metal-to-metal contacts while the third is a metal-to-rubber contact, but since the fittings, F, are embedded in rubber, the percentage of yield will be substantially the same in each case, and the load will be supported in part at each of the points of bearing.

In order that when the wheel is running close alongside of a street curb or street car rail, or other continuous elevation, the lateral surfaces of the lateral metal guards, 8, may be prevented from grinding against such rail or curb with the resulting disadvantage both of the unpleasant noise and also the rapid cutting away of the metal guards with the liability especially of cutting off the heads of the studs, G¹, the portion of the tread member, D, which protrudes from between the guards, is widened, not only so as to overhang the circumferences of the metal guards to prevent the latter from riding upon the rail or curb, but also beyond the vertical planes of the outer faces of said guards so that such protruding portion of the tread member will run in contact with the rail or curb, thus holding the metal guards away therefrom.

In addition to the features already described, the drawings show the fittings, F, provided with circumferentially-extending flanges, F⁷, which also assist in distributing the load from the guards, B, B, to the rubber of the tread, D; and to minimize friction between the pneumatic tube and the tread, there are also provided the wooden bearing blocks, H, embedded in the inner circumference of the tread member, D, and in contact with the outer circumference of the pneumatic tube, E.

I claim:—

1. A vehicle wheel tire comprising lateral guards; an elastic tread member embraced between them, and a multiplicity of separate rigid members separately secured to the elastic tread member at intervals in its circumference, a part of said rigid members being engaged with one of the lateral guards, and the remainder being engaged with the other lateral guard, said engagement being near the outer circumference of the guards, respectively, whereby the elastic tread member constitutes a part of flexible connections from guard to guard at a multiplicity of points in their circumference.

2. A vehicle wheel tire comprising lateral guards and an elastically flexible and compressible tread member embraced between them; separate inelastic lug members permanently engaged in the opposite sides of the tread member against detachment therefrom by lateral stress, and means by which such lugs at each side engage the guard at that side, whereby said lugs, together with the intervening portion of the tread member in which they are embedded, flexibly tie together the opposite guards.

3. A vehicle wheel tire comprising rigid lateral guards and an elastically flexible and compressible tread member embraced between them; a multiplicity of separate metal lug members embedded in the opposite sides of the tread member at the portion thereof which is embraced by the guards, said guards and lugs being adapted to coöperate for engagement of the lugs with the guards with a range of movement of the lug members radially with respect to the wheel, whereby said lug member and intervening portion of the elastic tread flexibly tie together the opposite guards without interfering with such radial movement.

4. In a vehicle wheel tire which comprises rigid lateral guards and an elastic flexible compressible tread member embraced between them, a multiplicity of metal lug members embedded in the opposite sides of the tread member at the portion thereof which is between the guards, the guards and lug members being relatively formed for engagement of the lug members with the guards against lateral stress, the lug members having each a flange extending in a plane transverse to the wheel axis and circumferentially thereof within the body of the tread member for engagement therewith against such lateral stress.

5. In a vehicle wheel, in combination with the felly, a tire comprising separate lateral guards secured to opposite sides of the felly and extending circumferentially therefrom; a flexible and elastic tread member embraced between the guards, said guards having each a circumferential groove opening toward the wheel axis; separate inelastic lug members permanently engaged in the opposite sides of the tread member against detachment therefrom by lateral stress, having lugs projecting into engagement with the grooves of the guards respectively, whereby with said tread member they flexibly tie together the opposite guards at their circumferences.

6. In a vehicle wheel in combination with the felly, a tire comprising lateral guards secured to opposite sides of said felly and extending circumferentially therefrom, each of said guards having a circumferential groove opening toward the wheel axis; a flexible and elastic tread member embraced between the guards and lugs embedded in opposite sides of said tread member and projecting into engagement with the grooves of the guards at their respective sides of the tread, each of said lugs having a flange extending in a plane transverse to the wheel axis and circumferentially thereof within the body.

7. In a vehicle wheel, in combination with the felly, a tire comprising lateral guards secured to opposite sides of said felly and extending circumferentially therefrom, a flexible and elastic tread member embraced between the guards, the guards having laterally extending guide studs; a series of metallic fittings embedded in the tread member at each side, each fitting comprising a pocket dimensioned to accommodate one of the guide studs and radially proportioned to limit the range of movement of the tread toward and from the felly, the tread member being laterally extended exteriorly of the guards for circumferential contact therewith at the limit of its movement toward the felly, the guards having each an interior circumferential shoulder, and the fittings having each a foot-piece extending of the inner circumference of the tread member for contact with said shoulder at the limit of movement of the tread member toward the felly as determined by the studs in said pockets.

In testimony whereof, I have hereunto set my hand at Chicago, Illinois, this 16th day of March, 1912.

MELVILLE CLARK.

Witnesses:
   LUCY I. STONE,
   M. GERTRUDE ADY.

---

Copies of this patent may be obtained for five cents each, by addressing the "Commissioner of Patents, Washington, D. C."